No. 821,035. PATENTED MAY 22, 1906.
M. H. HANSEN.
WEIGHING SCALE.
APPLICATION FILED JUNE 29, 1905.
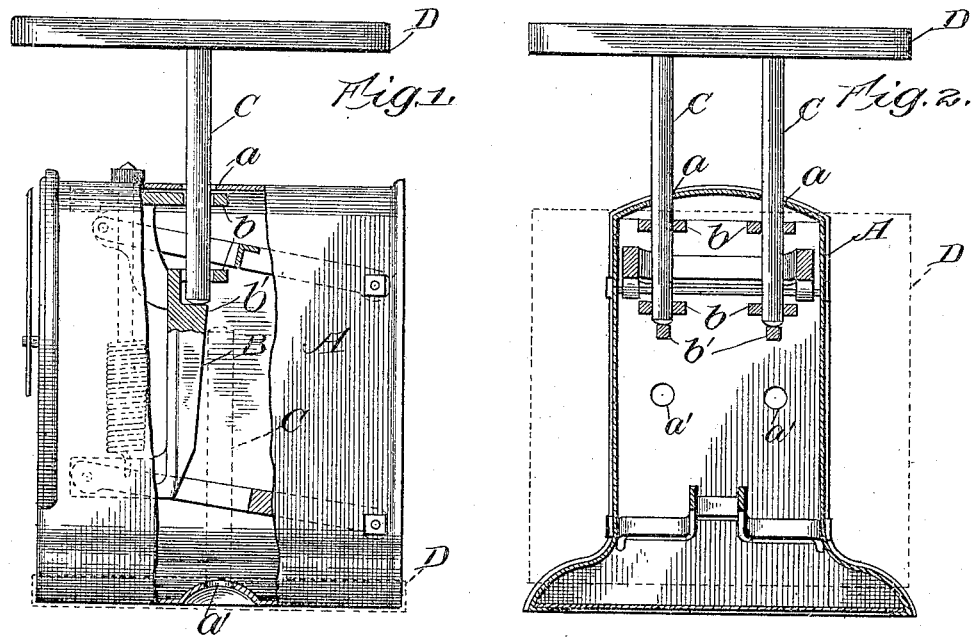
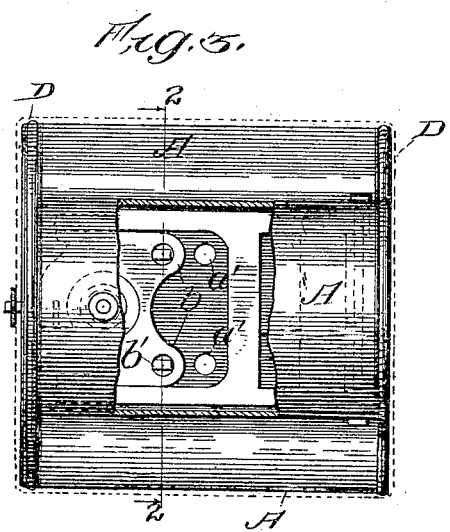

UNITED STATES PATENT OFFICE.

MARIUS H. HANSEN, OF CHICAGO, ILLINOIS.

WEIGHING-SCALE.

No. 821,035.  Specification of Letters Patent.  Patented May 22, 1906.

Application filed June 29, 1905. Serial No. 267,588.

*To all whom it may concern:*

Be it known that I, MARIUS H. HANSEN, a citizen of the United States, residing at Chicago, in the county of Cook and State of Illinois, have invented certain new and useful Improvements in Weighing-Scales, of which the following is a specification.

The present invention relates to that class of scales in which the weighing mechanism is contained within a casing having in its top an opening through which passes the post by which the pan or platform is carried. This post must project a considerable distance above the top of the casing in order to permit the downward movement of the pan or platform (the term "platform" alone is hereinafter used) under the influence of the maximum load, so that the height of the scale over all is considerably greater than the height of the casing. The platform is sometimes made removable from the post; but heretofore the post has been made integral with some part of the weighing mechanism located within the casing. Usually it is integral with the vertical load-beam in scales of the type shown in the drawings. It is objectionable to have the post project above the casing when the scale is packed away for storage or handling whether the platform is removable or not, because it increases the space required for storage, it is apt to be broken off or cause some part of the weighing mechanism to be broken, and it is apt to cause dislocation of the parts for actuating the pointer.

With a fixed post and platform the overall dimensions of the packing-space required even for a small scale having a maximum weighing capacity of twenty-five pounds is about one-half again as much as would be required if the projecting part of the post and the platform were removed, and the condition is not altered by removing the platform, leaving the post projecting, because these scales are usually packed in individual boxes, and the cubical dimensions of the box will be the same whether the platform be left in place on the fixed post or removed therefrom and placed against the bottom or one of the vertical sides of the casing. Furthermore, to protect the post from injury by lateral shocks it has heretofore been necessary to use wooden boxes, while less expensive boxes would answer every purpose were it not for the necessity for providing this protection; but aside from these objections and assuming the scale to be packed in a stout box that effectually protects the post against lateral strains the projecting post is still objectionable because in handling and shipping the scale is frequently subjected to severe shocks which suddenly force the post inward and put the spring under tension and as suddenly allow the spring to recoil with liability to dislocate the mechanism for actuating the pointer. For instance, if the scale should be in inverted position with its entire weight resting upon the post and the box containing it be allowed to fall the mechanism would be violently disturbed, with a consequent tendency to dislocation or breakage.

The object of the present invention is to provide a scale that is not open to any of these objections. To this end I locate the weighing mechanism wholly within the casing and make the post removable and adapted to pass through the customary opening in the top of the casing and enter a socket in or otherwise removably engage some part of the weighing mechanism, preferably the load-beam. In addition to this I provide the casing with a second opening into which the post may be inserted far enough to bring the under side of the platform against one side of the casing. The location of this opening is such that when the post is inserted it will not come in contact with any part of the weighing mechanism so as to disturb it. Furthermore, it is preferably located so that the sides of the platform will be parallel or substantially parallel with the side of the casing against which it rests.

In the accompanying drawings, which are made a part of this specification, Figure 1 is a sectional elevation of a scale embodying the invention. Figs. 2 and 3 are respectively a sectional elevation and a sectional plan showing two modifications.

Referring to Fig. 1, A represents the casing, which may be of any desired construction so long as it has the features hereinafter described. The weighing mechanism also may be of any desired construction so long as no part of it which if struck is apt to be injured or result in the injury of some other part projects any considerable distance from the casing. A part of the weighing mechanism, preferably the load-beam B, is provided with a socket for receiving the lower portion of the post C, which supports the platform D, the top of the casing being provided with an opening $a$, through which the post passes, and is adapted to move up and down in customary manner. In the instance given in the drawings the socket consists of two ears b, carried by the beam B and perforated for the passage of the post C, and a lug or shoulder b', also carried by said beam, upon which the lower end of the post bears.

When it is desired to pack the scale, the post is removed, the platform going with it, and the post is inserted into an opening a' in the bottom of the casing, so that the platform bears against said bottom. This opening is so located that the post when inserted does not contact with any part of the weighing mechanism. In the instance here given it is located centrally of the bottom and the post avoids the weighing mechanism, because in scales of this type the post when in position for use occupies a position somewhat forward of the center and the load-beam is correspondingly placed. The bottom of the casing and the platform both being rectangular, their sides may be placed parallel, and with a flanged platform somewhat larger than the bottom they will "nest," as indicated by dotted lines in Fig. 1. This is not essential, however, and in Fig. 3 I have indicated by dotted lines a platform somewhat smaller than the bottom. In this figure and in Fig. 2 I have shown a platform having twin posts and a load-beam having corresponding sockets for their reception; but the invention is not limited to any particular number of posts and sockets. It requires only that the casing be provided with an opening for admitting each post to its appropriate socket and an opening a' for each post for packing purposes; nor is it essential that this latter opening be through the bottom of the casing, and in Fig. 2 I have shown twin openings a' formed through the back of the casing.

What I claim as new, and desire to secure by Letters Patent, is—

1. A weighing-scale having weighing mechanism, a casing containing the weighing mechanism and having an opening through its top, a post extending through said opening and removably engaging a part of the weighing mechanism, and a platform carried by the post, the casing having also an opening for receiving said post for packing purposes, substantially as described.

2. A weighing-scale having weighing mechanism, a casing containing the weighing mechanism and having an opening through its top, a post extending through said opening and engaging a part of the weighing mechanism, said part having a socket in which said post fits removably, and a platform carried by the post, said casing having also an opening for receiving said post for packing purposes, substantially as described.

3. A weighing-scale having weighing mechanism, including a load-beam provided with a socket, a casing containing the weighing mechanism and having through its top an opening opposite said socket, a post passing through said opening and removably fitting in said socket, and a platform carried by the post the casing having also an opening for receiving said post for packing purposes, substantially as described.

MARIUS H. HANSEN.

Witnesses:
L. M. HOPKINS,
WILLIAM J. HANSEN.